INVENTORS
ARTHUR H. WNEK
STOWE RICHARDS
HERBERT M. CASE
BRUCE G. ROOK

BY Richard S. Shreve

ATTORNEY

INVENTORS
ARTHUR H. WNEK
STOWE RICHARDS
HERBERT M. CASE
BRUCE G. ROOK

BY Richard S Shreve, Jr
ATTORNEY

United States Patent Office 3,287,482
Patented Nov. 22, 1966

3,287,482
PARISON CUTTING METHOD AND APPARATUS
Arthur H. Wnek, Whippany, Stowe Richards, Stanton, Herbert M. Case, Somerville, and Bruce G. Rook, Wyckoff, N.J., assignors to Union Carbide Corporation, a corporation of New York
Filed Feb. 12, 1963, Ser. No. 258,016
7 Claims. (Cl. 264—150)

This invention relates to parison cutting knives, and more particularly to a high speed knife for cutting parisons being continuously extruded in a blow molding process.

The blow molding process involves grabbing a length of continuously extruding parison near the tubing die, cutting it from its source and lowering it to a blow mold. This operation becomes critical at the high speed (up to 5"/sec.) extrusion rates necessary for high bottle production rates.

It has not been found possible to cut high speed continuously forming parisons in the open (i.e., without a fixed end). On the other hand, the use of a knife blade against the parison at the die face blocks the extrusion for short periods of time. During a knife action of only 0.025 second, for example, an ⅛" of parison will be extruded which is sufficient in some cases to cause the opposing sides of the tube to touch and seal shut. Parisons with closed ends will collapse as they are extruded.

The timing of cutting and grabbing is critical. To cut before grabbing will cause the parison to fall through the grabber. To cut any appreciable time after grabbing will result in excessive buildup on the closed grabber. The synchronization of separate cutting and grabbing mechanisms is therefore very difficult. In a sequential limit switch operation, for example, the time required to activate a solenoid valve through a relay might be as high as 0.1 second. 0.5" of parison would be piled on top of the grabbing mechanism before the knife has started to move.

The timing of cutting and lowering is equally critical for the same reason, build up on the closed grabbers.

One of the novel features of the invention is a line rather than a plane cutting edge. This is accomplished by making the blade edge parallel with rather than perpendicular to the line of flow. The blockage of the die is thereby at an absolute minimum.

Another novel feature is clearance after cutting to avoid tube buildup. The hole in the blade allows uninterrupted extrusion during the time lag that occurs between cutting and complete clearance.

A further novel feature is the maintained contact permitting cutting while falling. This is accomplished by the spring action of the blade. This feature minimizes the problem of the extrusion rate substantially exceeding the down speed of the grabber during the early phases of travel. It permits the grabbing device to start to fall while it is closing without pulling the blade away from the die face.

The novel mounting system is simply the placement of the block on the grabbing device itself so that the synchronization is automatic; the cut is made as the tube is grabbed.

Figure 1:
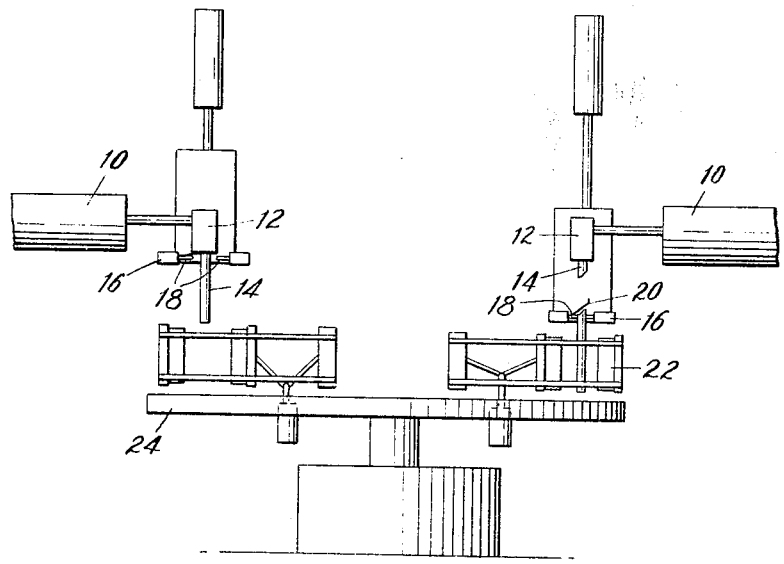
FIGURE 1 is an elevation of the blow molding machine employing the apparatus for, and for carrying out the method of, the present invention.

The blow molding apparatus comprises an extruder 10 having a tubing die 12 through which a parison 14 is extruded. A lowering mechanism 16 carries gripping jaws 18 which grasp the parison 14, and a knife 20 severs the parison between the jaws 18 and the die 12.

The mechanism 16 lowers the jaws 18 and parison 14 to deliver the parison into a mold 22 on an indexing table 24. The indexing table 24 indexes a succession of molds 22 into position below the die 12 for receiving successive parisons as they are extruded, cut and lowered.

Figure 2:
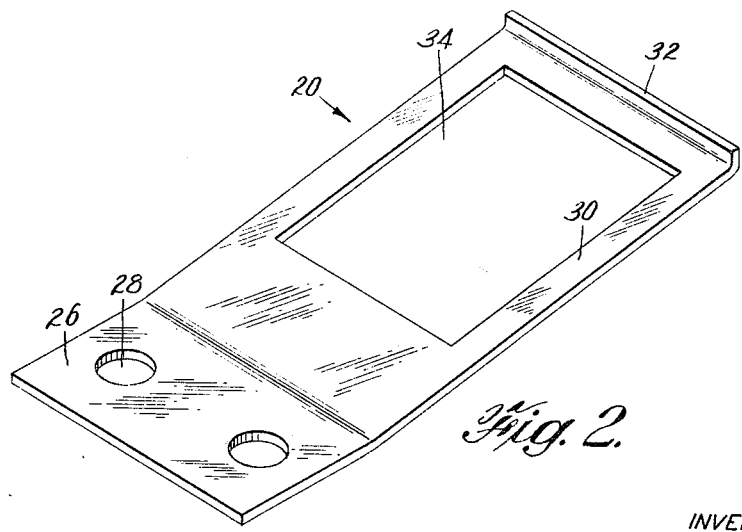
FIGURE 2 is a perspective view of the knife employed in FIGURE 1.

The knife 20 is better shown in FIGURE 2, comprising a blank of spring steel having a base 26 having bolt holes 28 for securing the same to a gripper jaw 18. From the base 26 a blade portion 30 extends upwardly at an acute angle to the base 36. The upper end of the blade portion 36 is bent upward at an obtuse angle to form an upstanding flange, terminating in a cutting edge 32, the plane of which flange portion is parallel to, rather than perpendicular to the line of flow of the parison being extruded by the tubing die 12, to offer minimum obstruction to such flow.

Figure 4:
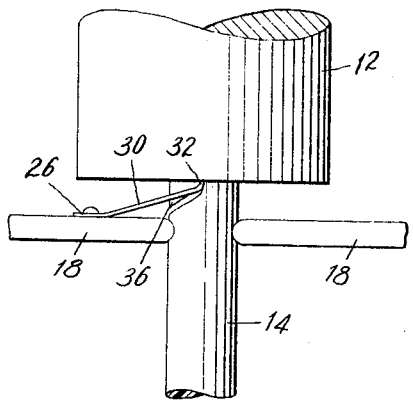
FIGURE 4 is a similar view showing the parts in midstroke.

The blade portion 30 has a large rectangular aperture 34, which as shown in FIGURE 4, receives the oncoming material 36 to avoid buildup, and allow continual extrusion during the stroke of the knife.

Figure 3:
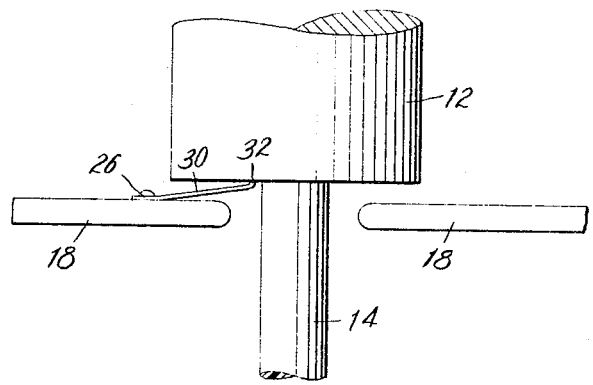
FIGURE 3 is an elevation of the knife and parison grabbers in starting position.

After the parts have left the position of FIGURE 3, and the gripping jaws have moved toward each other and the knife is in mid-stroke, and the gripping jaws and parison have started to lower, as shown in FIGURE 4, the spring action of the blade 30 maintains contact of the blade edge with tubing die 12.

What is claimed is:

1. In a molding process in which a parison is continuously extruded from a die, cut with a cutting blade from said die and grasped by lowering jaws for lowering to a mold the improvement comprising lowering at least a portion of the blade in concert with said jaws while resiliently maintaining the cutting edge of said blade in contact with the face of said die throughout the cutting operation, maintaining said blade substantially parallel to the direction of extrusion to present a narrow edge to the oncoming extrudate as it is cut and providing an aperture in said blade below the cutting edge of sufficient area to allow the passage of said parison and thereby minimize the blockage of said die during said cutting step.

2. The process of claim 1 in which the cutting blade is mounted on one of said lowering jaws and wherein said cutting edge is maintained in contact with the face of the extrusion die throughout the cutting operation as said jaws lower by spring action of said blade.

3. In a blow molding process in which a parison is continuously extruded from a tubing die, cut with a cutting blade from said die while being lowered by lowering jaws into a mold, said cutting blade being mounted on one of said lowering jaws, the improvement comprising resiliently maintaining the cutting edge of said blade in contact with the face of said die throughout the cutting operation, maintaining said blade substantially parallel to the direction of extrusion to present a relatively narrow edge to the oncoming extrudate as it is cut and providing an aperture in said blade below said cutting edge of sufficient size to allow the passage of said parison therethrough and thereby minimize the blockage of said die during said cutting step.

4. A molding process which comprises continuously extruding a parison from a die, cutting off said parison at the orifice of said die with a cutting blade, resiliently maintaining the cutting edge of said blade in contact with the face of said die throughout the cutting operation, maintaining said blade substantially parallel to the direction of said extrusion to present a narrow edge to the oncoming extrudate, providing an aperture in said blade below the cutting edge to permit the relatively unobstructed flow of said extrudate therethrough, gripping said parison with lowering jaws below said die and said blade and lowering said parison directly into a mold clamping unit in a parison receiving zone, at least a portion of said blade lowering in concert with said jaws, closing said unit on said parison, removing the closed unit from said zone while continuing to form another parison at said die, indexing another mold clamping unit in said zone and repeating said steps.

5. In a molding apparatus comprising a die adapted to continuously extrude a parison, a cutting blade for cutting said parison from said die and lowering jaws for grasping said parison and lowering it to a mold, said blade being mounted to lower in concert with said jaws, the improvement comprising means for resiliently maintaining the cutting edge of said blade in contact with the face of said die while moving said blade across the die face during the cutting operation and for maintaining said blade substantially parallel with the direction of extrusion, said blade having an aperture below the cutting edge to permit passage of the extrudate therethrough and minimize the blockage of said die during said cutting operation.

6. The apparatus of claim 5 in which said cutting blade is resiliently moved on one of said lowering jaws so that said cutting edge is maintained in contact with the face of said extrusion die throughout the cutting operation as said jaws lower.

7. A molding apparatus comprising a die adapted to continuously extrude a parison, lowering jaws for clamping the parison below said die, a cutting blade mounted between said die and lowering jaws for cutting said parison from said die, means for resiliently maintaining the cutting edge of said blade in contact with the face of said die during the cutting operation, means for maintaining said blade substantially parallel with the direction of extrusion, said blade having an aperture below the cutting edge to permit passage of the extrudate therethrough and to minimize the blockage of said die during said cutting operation, means for lowering said lowering jaws at a rate greater than the rate of extrusion and for lowering at least a portion of said blade in concert with said lowering jaws, an indexing table below said die and lowering jaws, and mold clamping units mounted on said indexing table directly and successively receiving said lowered parisons from said lowering jaws.

References Cited by the Examiner

UNITED STATES PATENTS

| | | | |
|---|---|---|---|
| Re. 23,564 | 10/1952 | Hobson | 18—55 X |
| 2,838,012 | 6/1958 | Weidnmiller et al. | |
| 2,928,120 | 3/1960 | Leghorn et al. | 18—55 X |
| 2,936,481 | 5/1960 | Wilkalis et al. | 18—55 X |
| 2,943,349 | 7/1960 | Adams et al. | |
| 3,000,050 | 9/1961 | Schaich | 18—55 X |
| 3,048,889 | 8/1962 | Fischer et al. | |
| 3,069,722 | 12/1962 | Kato. | |

ROBERT F. WHITE, *Primary Examiner.*

MORIS LIEBMAN, *Examiner.*

M. ROSEN, S. A. HELLER, *Assistant Examiners.*

UNITED STATES PATENT OFFICE
CERTIFICATE OF CORRECTION

Patent No. 3,287,482                                  November 22, 1966

Arthur H. Wnek et al.

It is hereby certified that error appears in the above numbered patent requiring correction and that the said Letters Patent should read as corrected below.

Column 3, line 2, for "moved" read -- mounted --.

Signed and sealed this 18th day of March 1969.

(SEAL)
Attest:

Edward M. Fletcher, Jr.                                EDWARD J. BRENNER
Attesting Officer                                         Commissioner of Patents